United States Patent
Puthiyedath et al.

(10) Patent No.: US 9,529,708 B2
(45) Date of Patent: Dec. 27, 2016

(54) APPARATUS FOR CONFIGURING PARTITIONS WITHIN PHASE CHANGE MEMORY OF TABLET COMPUTER WITH INTEGRATED MEMORY CONTROLLER EMULATING MASS STORAGE TO STORAGE DRIVER BASED ON REQUEST FROM SOFTWARE

(75) Inventors: Leena K. Puthiyedath, Portland, OR (US); Blaise Fanning, Folsom, CA (US); Toby Opferman, Beaverton, OR (US); James B. Crossland, Banks, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/976,362

(22) PCT Filed: Sep. 30, 2011

(86) PCT No.: PCT/US2011/054414
§ 371 (c)(1),
(2), (4) Date: Jan. 27, 2014

(87) PCT Pub. No.: WO2013/048490
PCT Pub. Date: Apr. 4, 2013

(65) Prior Publication Data
US 2014/0297938 A1   Oct. 2, 2014

(51) Int. Cl.
G06F 12/00 (2006.01)
G06F 12/02 (2006.01)
(Continued)

(52) U.S. Cl.
CPC .......... *G06F 12/0238* (2013.01); *G06F 12/08* (2013.01); *G06F 12/0638* (2013.01);
(Continued)

(58) Field of Classification Search
CPC ... G06F 12/0238; G06F 12/08; G06F 12/0866
(Continued)

(56) References Cited

U.S. PATENT DOCUMENTS 5,097,118 A   3/1992   Iijima
5,230,052 A   7/1993   Dayan et al.
(Continued)

FOREIGN PATENT DOCUMENTS

CN   1101442 A    4/1995
CN   1682199 A    10/2005
(Continued)

OTHER PUBLICATIONS

Lee et al., "Architecting Phase Change Memory as a Scalable DRAM Alternative", ISCA '09, Jun. 20, 2009, 12 pgs., Austin, Texas, USA.
(Continued)

*Primary Examiner* — Tammara Peyton
(74) *Attorney, Agent, or Firm* — Blakely, Sokoloff, Taylor & Zafman LLP

(57) ABSTRACT

A non-volatile random access memory (NVRAM) is used in a computer system to perform multiple roles in a platform storage hierarchy, specifically, to replace traditional mass storage that is accessible by an I/O. The computer system includes a processor to execute software and a memory coupled to the processor. At least a portion of the memory comprises a non-volatile random access memory (NVRAM) that is byte-rewritable and byte-erasable by the processor. The system further comprises a memory controller coupled to the NVRAM to perform a memory access operation to access the NVRAM in response to a request from the software for access to a mass storage.

15 Claims, 9 Drawing Sheets

(51) Int. Cl.
*G06F 12/08* (2016.01)
*G06F 12/06* (2006.01)

(52) U.S. Cl.
CPC .. *G06F 12/0866* (2013.01); *G06F 2212/2024* (2013.01); *G06F 2212/214* (2013.01); *G06F 2212/251* (2013.01); *G06F 2212/7201* (2013.01)

(58) Field of Classification Search
USPC .......................... 710/1, 8–10; 711/103, 114
See application file for complete search history.

(56) References Cited

U.S. PATENT DOCUMENTS

| | | | |
|---|---|---|---|
| 5,511,202 | A | 4/1996 | Combs et al. |
| 5,535,357 | A | 7/1996 | Moran et al. |
| 5,544,356 | A | 8/1996 | Robinson et al. |
| 5,822,581 | A | 10/1998 | Christeson |
| 5,905,993 | A * | 5/1999 | Shinohara .............. 711/103 |
| 5,912,839 | A | 6/1999 | Ovshinsky et al. |
| 6,018,806 | A | 1/2000 | Cortopassi et al. |
| 6,035,432 | A | 3/2000 | Jeddeloh |
| 6,292,874 | B1 | 9/2001 | Barnett |
| 6,345,349 | B1 | 2/2002 | Coulson |
| 7,057,911 | B2 | 6/2006 | Klint |
| 7,058,779 | B1 | 6/2006 | McClain |
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |
| 8,176,233 | B1 | 5/2012 | Karamcheti |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,532,973 | B1 * | 9/2013 | CaraDonna ............. G06F 3/067 703/13 |
| 8,605,531 | B2 | 12/2013 | Kau et al. |
| 8,607,089 | B2 | 12/2013 | Qawami et al. |
| 8,612,676 | B2 | 12/2013 | Dahlen et al. |
| 8,612,809 | B2 | 12/2013 | Casper et al. |
| 8,649,212 | B2 | 2/2014 | Kau et al. |
| 8,799,557 | B1 * | 8/2014 | Chen ................... G06F 12/0638 711/103 |
| 8,838,935 | B2 | 9/2014 | Hinton |
| 2002/0078319 | A1 | 6/2002 | Chauvel et al. |
| 2002/0105523 | A1 | 8/2002 | Behrbaum et al. |
| 2002/0129212 | A1 | 9/2002 | Lee |
| 2003/0033515 | A1 | 2/2003 | Autry |
| 2004/0136259 | A1 * | 7/2004 | Klint ................... G06F 13/1694 365/232 |
| 2005/0027933 | A1 | 2/2005 | Iyengar |
| 2005/0060526 | A1 | 3/2005 | Rothman et al. |
| 2005/0210180 | A1 | 9/2005 | Rothman et al. |
| 2005/0223157 | A1 | 10/2005 | Floman et al. |
| 2005/0251617 | A1 * | 11/2005 | Sinclair et al. ............... 711/103 |
| 2005/0273584 | A1 | 12/2005 | Wisecup et al. |
| 2006/0184722 | A1 | 8/2006 | Sinclair |
| 2006/0271724 | A1 | 11/2006 | Purcell et al. |
| 2007/0005922 | A1 | 1/2007 | Swaminathan et al. |
| 2007/0101077 | A1 | 5/2007 | Evanchik et al. |
| 2007/0105267 | A1 | 5/2007 | Karpov et al. |
| 2007/0255891 | A1 | 11/2007 | Chow et al. |
| 2007/0294496 | A1 | 12/2007 | Goss et al. |
| 2008/0016269 | A1 | 1/2008 | Chow et al. |
| 2008/0034148 | A1 | 2/2008 | Gower |
| 2008/0082766 | A1 | 4/2008 | Okin et al. |
| 2008/0109592 | A1 | 5/2008 | Karamcheti et al. |
| 2008/0141043 | A1 | 6/2008 | Flynn et al. |
| 2008/0168186 | A1 | 7/2008 | Gregg |
| 2008/0215828 | A1 | 9/2008 | Caulkins |
| 2008/0250189 | A1 | 10/2008 | Cheng |
| 2008/0270811 | A1 | 10/2008 | Chow et al. |
| 2009/0113198 | A1 | 4/2009 | Liu et al. |
| 2009/0119498 | A1 | 5/2009 | Narayanan |
| 2009/0172379 | A1 | 7/2009 | Rothman et al. |
| 2009/0271562 | A1 | 10/2009 | Sinclair |
| 2009/0313416 | A1 | 12/2009 | Nation |
| 2010/0131827 | A1 | 5/2010 | Sokolov |
| 2010/0191898 | A1 | 7/2010 | Kim et al. |
| 2010/0235832 | A1 | 9/2010 | Rajagopal et al. |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0315874 | A1 | 12/2010 | Ghodsi |
| 2010/0318718 | A1 | 12/2010 | Eilert et al. |
| 2011/0047365 | A1 | 2/2011 | Hentosh et al. |
| 2011/0153916 | A1 | 6/2011 | Chinnaswamy et al. |
| 2011/0197018 | A1 | 8/2011 | Noh et al. |
| 2011/0208900 | A1 | 8/2011 | Schuette et al. |
| 2011/0291884 | A1 | 12/2011 | Oh et al. |
| 2012/0271985 | A1 | 10/2012 | Jeong et al. |
| 2012/0311262 | A1 | 12/2012 | Franceschini et al. |
| 2012/0324156 | A1 | 12/2012 | Muralimanohar et al. |
| 2013/0275661 | A1 * | 10/2013 | Zimmer ............. G06F 12/0246 711/103 |
| 2013/0282967 | A1 | 10/2013 | Ramanujan |
| 2014/0075107 | A1 | 3/2014 | Qawami et al. |

FOREIGN PATENT DOCUMENTS

| | | | |
|---|---|---|---|
| CN | 101331465 | A | 12/2008 |
| CN | 101620539 | A | 1/2010 |
| EP | 0806726 | A1 | 11/1997 |
| EP | 1331548 | A2 | 8/2003 |
| EP | 1965297 | A1 | 9/2008 |
| JP | S621911947 | A | 8/1987 |
| TW | 200519595 | A | 6/2005 |
| TW | I247489 | A | 1/2006 |
| TW | 200821909 | A | 5/2008 |
| TW | 200949688 | A | 12/2009 |
| WO | 2005/002060 | | 1/2005 |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al, "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs.

"The Non-Volatile Systems Laboratory NV-Heaps: Fast and Safe Persistent Objects", http://nvsl.ucsd.edu/nvuheaps/, 2 pgs.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

"Compressed NVRAM based Memory Systems", 9 pgs.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

(56) References Cited

OTHER PUBLICATIONS

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

PCT Notification concerning Transmittal of International Preliminary Report on Patentability (Chapter I of the Patent Cooperation Treaty) for PCT Counterpart Application No. PCT/US2011/054421, 6 pgs., (Apr. 10, 2014).

International Preliminary Report on Patentability for International Application No. PCT/US2011/054414, dated Apr. 10, 2014, 5 pages.

PCT International Search Report mailed Jun. 1, 2012 for PCT Application No. PCT/US2011/054414, filed Sep. 30, 2011, 8 pages.

PCT Written Opinion of the International Searching Authority mailed Jun. 1, 2012 for PCT Application No. PCT/US2011/054414, filed Sep. 30, 2011, 3 pages.

Supplementary European Search Report for European Appln. No. 11873493.8 mailed Jun. 1, 2015, 9 pgs.

Edel, Nathan, et. al., "MRAMFS: A compressing file system for non-volatile RAM, Proceedings." The IEEE Computer and Telecommunications Systems, Apr. 2004, 8 pages.

Baek, Seungjae, et. al., "Design and Analysis of a Space Conscious Nonvolatile-RAM File System," Tencon, 2006 IEEE Region 10 Conference, Nov. 2006, 4 pages.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Text of the First Office Action in related Chinese Application No. 201180075251.0, issued on Feb. 6, 2016, 13 pages including English translation.

Wu, et al., "eNVy: A Non-Volatile, Main Memory Storage System" 1994 ACM., ASPLOS VI. pp. 86-97.

\* cited by examiner

APPARATUS FOR CONFIGURING PARTITIONS WITHIN PHASE CHANGE MEMORY OF TABLET COMPUTER WITH INTEGRATED MEMORY CONTROLLER EMULATING MASS STORAGE TO STORAGE DRIVER BASED ON REQUEST FROM SOFTWARE

CROSS-REFERENCE TO RELATED APPLICATION

This patent application is a U.S. National Phase Application under 35 U.S.C. §371 of International Application No. PCT/US2011/054414, filed Sep. 30, 2011, entitled NON-VOLATILE RANDOM ACCESS MEMORY (NVRAM) AS A REPLACEMENT FOR TRADITIONAL MASS STORAGE.

BACKGROUND

Field

Embodiments of the invention relate to a computer system; and more specifically, to the use of non-volatile random access memory as a replacement for traditional mass storage.

Description of the Related Art

A. Current Memory and Storage Configurations

One of the limiting factors for computer innovation today is memory and storage technology. In conventional computer systems, system memory is typically implemented by dynamic random access memory (DRAM). DRAM-based memory consumes power even when no memory reads or writes occur because it must constantly recharge internal capacitors. DRAM-based memory is volatile, which means data stored in DRAM memory is lost once the power is removed.

With respect to mass storage, conventional mass storage devices typically include non-volatile magnetic media (e.g., hard disk drives) and/or flash memory (also referred to as "flash") (e.g., solid state drives (SSDs)). These storage devices are block-addressable, which means that a single byte of storage cannot be accessed individually. Rather, bytes are read and written as multi-byte (e.g., 16 bytes or larger) blocks of data. Generally, these storage devices are considered I/O devices because they are accessed by the processor through various I/O adapters that implement various I/O protocols. These I/O adapters and I/O protocols consume a significant amount of power and can have a significant impact on the die area and the form factor of the platform. Additionally, for portable or mobile devices (e.g., tablet computers, cameras and mobile phones) that have limited battery life, their storage devices (e.g., Embedded Multimedia Card (eMMC) and Secure Digital (SD) card) are typically coupled to the processor via low-power interconnects and I/O controllers in order to meet active and idle power budgets. These interconnect and I/O controllers cannot consistently deliver the bandwidth required for a satisfying user experience.

With respect to firmware memory, a conventional computer system typically uses flash memory devices to store persistent system information that is read often but seldom (or never) written to. For example, Basic Input and Output System (BIOS) images are typically stored in a flash memory device. Flash memory devices that are currently available in the market generally have limited speed (e.g., 50 MHz). This speed is further reduced by the overhead for read protocols (e.g., 2.5 MHz). In order to speed up the BIOS execution speed, conventional processors generally cache a portion of BIOS code during the Pre-Extensible Firmware Interface (PEI) phase of the boot process. However, the processor cache has a very limited amount of capacity. Thus, the amount of BIOS code that can be used for the initial system configuration is also very limited. The size limitation of the processor cache places a significant restriction on the size of the BIOS code used in the PEI phase (also known as the "PEI BIOS code"). Therefore, the PEI BIOS code cannot be easily extended to support a large mix of memory configurations and multiple processor families. With the rising demand for initialization of processors, process interconnects, memory and storage implemented with various technologies and multiple processor families, the need for more versatile PEI BIOS code also grows. One solution is to build a larger processor cache for caching the code. However, the size of the processor cache cannot be easily increased without a negative impact on the rest of the system.

B. Phase-Change Memory (PCM) and Related Technologies

Phase-change memory (PCM), also sometimes referred to as PCME, PRAM, PCRAM, Ovonic Unified Memory, Chalcogenide RAM and C-RAM, is a type of non-volatile computer memory which exploits the unique behavior of chalcogenide glass. As a result of heat produced by the passage of an electric current, this material can be switched between two states: crystalline and amorphous. Recent versions of PCM can achieve two additional distinct states, effectively doubling memory storage capacity. PCM is one of a number of new memory technologies competing in the non-volatile role with flash memory. Flash memory has a number of practical problems which these replacements hope to address.

For example, PCM can offer much higher performance in applications where writing quickly is important, in part because the memory element can be switched more quickly, and also because individual bits may be changed to either 1 or 0 without the need to first erase an entire block of cells (as is the case with flash). The high performance of PCM makes it potentially very beneficial in non-volatile memory roles that are currently performance-limited by memory access timing.

Additionally, while PCM devices degrade with use (like flash), they degrade much more slowly. A PCM device may survive approximately 100 million write cycles. PCM lifetime is limited by mechanisms such as degradation due to GST thermal expansion during programming, metal (and other material) migration, and other mechanisms.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

Embodiments of the invention described below define platform configurations that enable hierarchical memory subsystem organizations for the use of NVRAM. The use of NVRAM in the memory hierarchy also enables new usages such as expanded boot space and mass storage implementations, as described in detail below.

Figure 1:
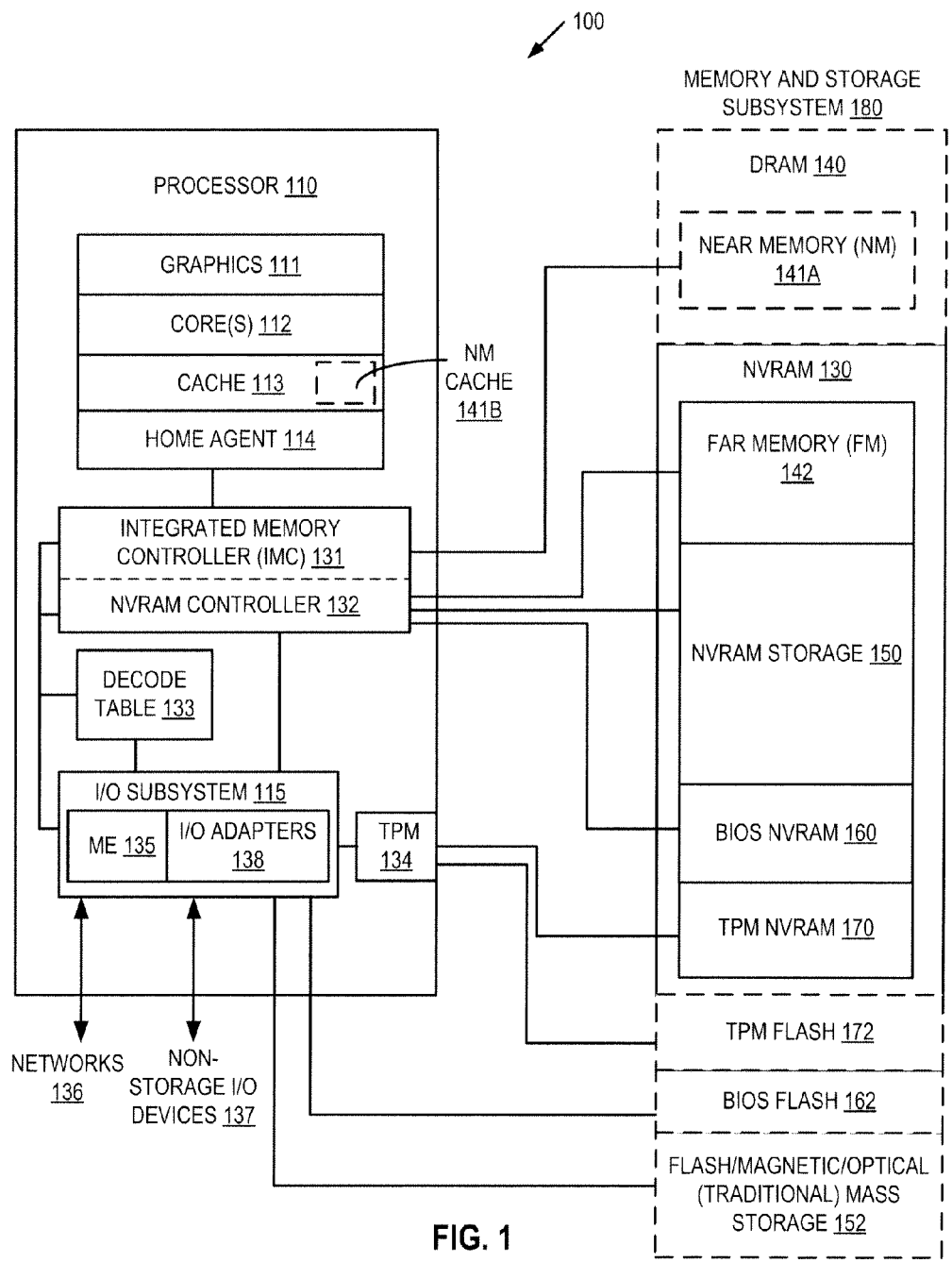
FIG. 1 illustrates a computer system that uses non-volatile memory random access (NVRAM) in one or more tiers of the platform storage hierarchy according to one embodiment of the invention.

FIG. 1 is a block diagram illustrating a computer system 100 that uses byte-addressable non-volatile random-access memory (NVRAM) 130 in one or more tiers of the platform storage hierarchy. The term "platform storage hierarchy" herein refers to the entire storage media used by computer system 100 for storing data, instructions, states, and other persistent and non-persistent information. In one embodiment, all persistent storage in the computer system 100 can coalesce into one NVRAM 130 in a configurable fashion. In addition, some portion of NVRAM 130 can be apportioned as DRAM replacement for system memory. The versatility of NVRAM 130 facilitates technology migration from a conventional platform having an operating system (OS) that operates on a persistent block-oriented file system, to an OS that understand a fully-persistent, byte-addressable, single-level data store.

In one embodiment, NVRAM 130 can be configured to implement the roles in a typical platform storage hierarchy as one or more of the following: cache, system memory (also known as main memory, primary memory, executable memory), storage (also known as secondary storage and mass storage), and firmware memory (such as boot memory (also known as BIOS flash), Trusted Platform Module (TPM) memory, Gigabit Ethernet network integrity controller (NIC) for storing its media access control (MAC) address, and the like). Platform storage hierarchies with different roles are also contemplated and the application of NVRAM 130 is not limited to the roles described above.

NVRAM (e.g., NVRAM 130) is distinguishable from other instruction and data memory/storage technologies in terms of its characteristics and/or its application in the platform storage hierarchy. For example, NVRAM is different from:

1) static random access memory ("SRAM") applied as a cache dedicated to a processor core or shared by multiple processor cores;
2) higher speed memory (e.g., dynamic random access memory ("DRAM")) applied as one or more caches internal to the processor (e.g., on the same die as the processor) and/or external to processor (e.g., on the same or a different package from the processor);
3) flash memory/magnetic disk/optical disc applied as drive storage; and memory such as flash memory or read only memory (ROM) applied as boot ROM.

In one embodiment of the invention NVRAM has the following characteristics:
1) non-volatile (it maintains its content even if power is removed, similar to flash memory used in solid state disks ("SSD"), and different from SRAM and DRAM which are volatile);
2) lower power consumption than volatile memories such as SRAM and DRAM;
3) random access (also known as randomly addressable);
4) rewritable and erasable at a lower level of granularity (e.g., byte level) than flash found in SSDs (which can only be rewritten and erased a "block" at a time—minimally 64 Kbyte in size for NOR flash and 16 Kbyte for NAND flash);
5) usable as a system memory and allocated all or a portion of the system address space; and
(6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte);

7) one or more of the following:
   a) faster write speed than current non-volatile memory/storage technologies (such as flash);
   b) very high read speeds (faster than flash and near or equivalent to DRAM read speeds);
   c) directly writable (rather than requiring erasing (overwriting with 1s) before writing data like flash memory used in SSDs); and/or
   d) orders of magnitude (e.g., 2 or 3) higher write endurance before failure (more than boot ROM and flash used in SSDs).

As mentioned above, in contrast to flash memory, which must be rewritten and erased a complete "block" at a time, the level of granularity at which NVRAM is accessed in any given implementation may depend on the particular memory controller and the particular memory bus to which the NVRAM is coupled. For example, in some implementations where NVRAM 130 is used as system memory, NVRAM may be accessed at the granularity of a cache line (e.g., a 64-byte or 128-byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by flash and the access size of the I/O subsystem's controller and bus.

NVRAM 130 may be used as instruction and data storage that has sufficiently short access time requirements to cause little impact on the processors. Here, program instructions and data may be loaded into NVRAM 130 from deeper, flash/magnetic/optical mass storage 152 prior to being executed by the processors. Moreover, as described in detail below, NVRAM 130 may be placed on a memory bus and may communicate directly with a memory controller that, in turn, communicates directly with the processors.

The presence of the new memory technology for NVRAM 130 provides for a wealth of new possibilities. Although discussed at much greater length further below, some of these possibilities are quickly highlighted immediately below.

According to one possible implementation, NVRAM 130 acts as a total replacement or supplement for traditional DRAM technology in system memory. In one embodiment, NVRAM 130 represents the introduction of a second-level system memory (e.g., system memory is as a combination of DRAM 140 and some or all of NVRAM 130). As such, the system memory may be viewed as having a near memory part NM 141A and a far memory part FM 142. It is appreciated that in different embodiments, a near memory can serve as a memory-side cache (e.g., near memory cache 141B), a scratch pad, and other roles that are different from the system memory. In the embodiments described herein, the NM 141A portion of NVRAM 130 serves only as system memory to simplify the discussion.

According to some embodiments, NVRAM 130 provides NVRAM storage, which acts as a total replacement or supplement for traditional mass storage, e.g., flash/magnetic/optical mass storage 152. The term "traditional mass storage" or in the application refers to mass storage that is based on optical, magnetic and/or flash technology, such as disk and flash memory. For simplicity of the discussion, flash/magnetic/optical mass storage 152 is also referred to as traditional mass storage 152. Thus, the non-volatile mass storage for computing system 100 may be implemented using NVRAM, flash memory, magnetic storage, or any combination thereof. In an embodiment where NVRAM storage 150 acts as a total replacement for traditional mass storage 152, it is not necessary to use storage drivers for block-addressable storage access. The removal of storage driver overhead from storage access can increase access speed and save power. In alternative embodiments where it is desired that NVRAM storage 150 appears to the OS and/or applications as block-accessible and indistinguishable from traditional mass storage 152, emulated storage drivers can be used to expose block-accessible interfaces (e.g., Universal Serial Bus (USB) Bulk-Only Transfer (BOT) 1.0, Serial Advanced Technology Attachment (SATA) 3.0, and the like) to the software for accessing NVRAM storage 150. In some embodiments, the byte addressability of NVRAM 130 can be used by a lowest-level storage driver to move blocks of NVRAM storage 150 and emulate block accessible mass storage without incurring the cost of I/O interfaces. An embodiment of utilizing the byte addressability of NVRAM 130 with a lowest-level storage driver will be described later in greater detail with reference to FIG. 5.

According to some embodiments, NVRAM 130 provides BIOS NVRAM 160 and TPM NVRAM 170, which act as a total replacement or supplement for firmware memory such as BIOS flash 162 and TPM flash 172. Firmware memory is commonly implemented with flash technology and commonly stores the initial instructions (e.g., BIOS) executed by a processor to initialize key system components during a boot process. Firmware memory can also store system persistent states used by a TPM 134 to protect sensitive system information (e.g., encryption keys). In one embodiment, the use of NVRAM 130 for firmware memory removes the need for third party flash parts to store code and data that are critical to the system operations.

The choice of memory and storage devices may depend on the type of platform on which the devices are used. For example, in a personal computer, tablet computer, notebook computer, mobile device (e.g., smartphone or PDA), the non-volatile mass storage may be implemented using NVRAM storage 150 alone, or using NVRAM storage 150 in combination with flash/magnetic storage. In other implementations (e.g., large-scale servers), the non-volatile mass storage may be implemented using magnetic storage (e.g., hard drives) or any combination of magnetic storage, flash, and NVRAM storage 150. In such a case, computer system hardware and/or software responsible for storage may implement various intelligent persistent storage allocation techniques to allocate blocks of persistent program code and data between the FM 142/NVRAM storage 150 and traditional mass storage 152 in an efficient or otherwise useful manner. In some embodiments, NVRAM 130 may become the sole memory/storage device off chip (i.e., off the processor chip). In some embodiments, instead of the off-chip DRAM 140, DRAM may be used to provide an on-chip cache (e.g., near memory cache 141B). These embodiments can be specifically relevant to very small platforms (e.g., smartphone or PDA), where multiple memory classes/technologies may be cost prohibitive and more transistors (including storage) can be placed on chip.

The NVRAM 130 may incorporate "wear leveling" algorithms to account for the fact that the storage cells at the far memory level begin to wear out after too many write accesses. Since high cycle count blocks are most likely to wear out in this manner, wear leveling spreads writes across the far memory cells by swapping addresses of high cycle count blocks with low cycle count blocks. Note that most address swapping is typically transparent to the end user because it is handled by hardware, software (e.g., a low level driver or operating system), or a combination of the.

In one embodiment, NVRAM 130 can be implemented with a non-volatile random access memory (NVRAM) such as PCM or, more specifically, PCMS (also known as (PRAM or PCRAM), Ovonic Unified Memory (OUM), (CRAM). Other possible technology choices for far memory include, but are not limited to byte-addressable persistent memory (BPRAM), storage class memory (SCM), universal memory, Ge2Sb2Te5, Programmable metallization cell (PMC), Resistive memory (RRAM), RESET (amorphous) cell, SET (crystalline) cell, PCME, Ovshinsky, ferroelectric memory (also known as polymer memory and poly(N-vinylcarbazole)), ferromagnetic memory (also known as Spintronics, SPRAM (spin-transfer torque RAM), STRAM (spin tunneling RAM), Magnetoresistive, Magnetic memory, and Magnetic random access memory (MRAM)), and Semiconductor-oxide-nitride-oxide-semiconductor (SONOS, also know dielectric memory).

For convenience of explanation, most of the remainder of the application will sometimes refer to "PCM" or "PCMS" as the technology selection for NVRAM 130. As such, the terms NVRAM, PCM and PCMS may be used interchangeably in the following discussion. However it should be realized, as discussed above, that different technologies may also be utilized for NVRAM 130.

Continuing then with a discussion of the system of FIG. 1, in some embodiments, the architecture of computer system 100 may include multiple processors, although a single processor 110 is illustrated in FIG. 1 for simplicity. Processor 110 may be any type of data processor including a general purpose or special purpose central processing unit (CPU), an application-specific integrated circuit (ASIC) or a digital signal processor (DSP). For example, processor 110 may be a general-purpose processor, such as a Core™ i3, i5, i7, 2 Duo and Quad, Xeon™, or Itanium™ processor, all of which are available from Intel Corporation, of Santa Clara, Calif. Alternatively, processor 110 may be from another company, such as ARM Holdings, Ltd, of Sunnyvale, Calif., MIPS Technologies of Sunnyvale, Calif., etc. Processor 110 may be a special-purpose processor, such as, for example, a network or communication processor, compression engine, graphics processor, co-processor, embedded processor, or the like. Processor 110 may be implemented on one or more chips included within one or more packages. Processor 110 may be a part of and/or may be implemented on one or more substrates using any of a number of process technologies, such as, for example, BiCMOS, CMOS, or NMOS.

In one embodiment, the processor 110 includes an integrated graphics unit 111 which includes logic for executing graphics commands such as 3D or 2D graphics commands. While the embodiments of the invention are not limited to any particular integrated graphics unit 111, in one embodiment, the graphics unit 111 is capable of executing industry standard graphics commands such as those specified by the Open GL and/or Direct X application programming interfaces (APIs) (e.g., OpenGL 4.1 and Direct X 11).

The processor 110 may also include one or more cores 112, although a single core 112 is illustrated in FIG. 1, again, for the sake of clarity. In many embodiments, core 112 includes internal functional blocks such as one or more execution units, retirement units, a set of general purpose and specific registers, etc. If core 112 is multi-threaded or hyper-threaded, then each hardware thread may be considered as a "logical" core as well. The cores 112 may be homogenous or heterogeneous in terms of architecture and/or instruction set. For example, some of the cores may be in order while others are out-of-order. As another example, two or more of the cores may be capable of executing the same instruction set, while others may be capable of executing only a subset of that instruction set or a different instruction set.

The processor 110 may also include one or more caches, such as cache 113 which may be implemented as a SRAM and/or a DRAM. In many embodiments that are not shown, additional caches other than cache 113 are implemented so that multiple levels of cache exist between the execution units in the core(s) 112 and memory devices 141A and 142. For example, the set of shared cache units may include an upper-level cache, such as a level 1 (L1) cache, mid-level caches, such as level 2 (L2), level 3 (L3), level 4 (L4), or other levels of cache, a last level cache (LLC), and/or different combinations thereof. In different embodiments, cache 113 may be apportioned in different ways and may be one of many different sizes in different embodiments. For example, cache 113 may be an 8 megabyte (MB) cache, a 16 MB cache, etc. Additionally, in different embodiments the cache may be a direct mapped cache, a fully associative cache, a multi-way set-associative cache, or a cache with another type of mapping. In other embodiments that include multiple cores, cache 113 may include one large portion shared among all cores or may be divided into several separately functional slices (e.g., one slice for each core). Cache 113 may also include one portion shared among all cores and several other portions that are separate functional slices per core. In one embodiment, cache 113 may include a DRAM near memory cache 141B.

The processor 110 may also include a home agent 114 which includes those components coordinating and operating core(s) 112. The home agent unit 114 may include, for example, a power control unit (PCU) and a display unit. The PCU may be or include logic and components needed for regulating the power state of the core(s) 112 and the integrated graphics unit 111. The display unit is for driving one or more externally connected displays.

In some embodiments, processor 110 includes an integrated memory controller (IMC) 131 to provide an interface for communicating with a memory and storage subsystem 180. More specifically, in one embodiment, IMC 131 contains logic necessary for reading from, writing to and refreshing DRAM device 140. IMC 131 can be on the same chip as processor 110, or on a separate chip and/or package connected to processor 110.

In some embodiments, processor 110 includes an I/O subsystem 115 coupled to IMC 131. I/O subsystem 115 enables communication between processor 110 and the following serial or parallel I/O devices: one or more networks 136 (such as a Local Area Network, Wide Area Network or the Internet), storage I/O device (such as traditional mass storage 152, BIOS flash 162, TPM flash 172) and one or more non-storage I/O devices 137 (such as display, keyboard, speaker, and the like). I/O subsystem 115 may include a platform controller hub (PCH) (not shown) that further includes several I/O adapters 138 and other I/O circuitry to provide access to the storage and non-storage I/O devices and networks. To accomplish this, I/O subsystem 115 may have at least one integrated I/O adapter 138 for each I/O protocol utilized. I/O subsystem 115 can be on the same chip as processor 110, or on a separate chip and/or package connected to processor 110.

I/O adapters 138 translate a host communication protocol utilized within the processor 110 to a protocol compatible with particular I/O devices. For traditional mass storage 152, some of the protocols that I/O adapters 138 may translate include Peripheral Component Interconnect (PCI)-Express 3.0, Universal Serial Bus (USB) 3.0, Serial Advanced Technology Attachment (SATA) 3.0, Small Computer System Interface (SCSI), Redundant Array of Inexpensive Disks (RAID) and 1394 "Firewire," among others. For BIOS flash 162, some of the protocols that I/O adapters 138 may translate include Serial Peripheral Interface (SPI), Microwire, among others. Additionally, there may be one or more wireless protocol I/O adapters. Examples of wireless protocols are Bluetooth 4.0, IEEE 802.11-based wireless protocols, and cellular protocols, among others.

In some embodiments, I/O subsystem 115 also includes a Management Engine (ME) 135, which is a microprocessor that allows a system administrator to monitor, maintain, update, upgrade, and repair computer system 100. In one embodiment, a system administrator can remotely configure computer system 100 through ME 135 via networks 136. In one embodiment, the configuration can be stored in a decode table 133 within processor 110. Decode table 133 can be read by IMC 131 and I/O subsystem 115, which then decide where a data access request should be directed.

In some embodiments, processor 110 includes a Trusted Platform Module (TPM) 134 to control access to system persistent states, such as secure data, encryption keys, platform configuration information and the like. In one embodiment, these system persistent states are stored in a TPM NVRAM 170, which can be implemented with PCM-based memory such as PCMS. In the embodiment shown in FIG. 1, TPM NVRAM 170 is part of NVRAM 130.

In one embodiment, TPM 134 is a secure micro-controller with cryptographic functionalities. TPM 134 has a number of trust-related capabilities; e.g., a "seal" capability for ensuring that data protected by a TPM is only available for the same TPM. TPM 134 can protect data and keys (e.g., secrets) using its encryption capabilities. In one embodiment, TPM 134 has a unique and secret RSA key (which is generated based on the RSA algorithm developed by Ron Rivest, Adi Shamir and Leonard Adleman), which allows it to authenticate hardware devices and platforms. For example, TPM 134 can verify that a system seeking access to data stored in computer system 100 is the expected system. TPM 134 is also capable of reporting the integrity of the platform (e.g., computer system 100). This allows an external resource (e.g., a server on a network) to determine the trustworthiness of the platform but does not prevent access to the platform by the user.

It should be understood that a computer system can utilize NVRAM 130 for system memory, mass storage, firmware memory and/or other memory and storage purposes even though its processor does not have all of the above-described components of processor 110, or has more components than processor 110.

In one embodiment, computer system 100 includes a NVRAM controller 132 to control data access to NVRAM 130. NVRAM controller 132 is coupled to IMC 131 and I/O subsystem 115. NVRAM controller 132 can read the configuration data from decode table 133, or alternatively, can rely on the decoding results passed from IMC 131 and I/O subsystem 115. In an embodiment where NVRAM 130 is implemented with PCMS, NVRAM controller 132 is a PCMS controller that performs byte-level access with protocols consistent with the PCMS technology. Although IMC 131 and NVRAM controller 132 can be two discrete controllers (as shown in FIG. 1 with a dotted line separating the two controllers), in some embodiments these two controllers can be implemented as one combined controller to control the access to memory and storage.

In FIG. 1, NVRAM controller 132 is shown connected to FM 142, NVRAM mass storage 150 and BIOS NVRAM 160 using three separate lines. This does not necessarily mean, however, that there are three separate physical buses or communication channels connecting NVRAM controller 132 to these portions of the NVRAM 130. Rather, in some embodiments, a common memory bus or other type of bus is used to communicatively couple the NVRAM controller 132 to the FM 142, NVRAM mass storage 150, and BIOS NVRAM 160. For example, in one embodiment, the three lines in FIG. 1 represent a DDR bus, such as a memory bus (e.g., a DDR3, DDR4, etc.) over which NVRAM controller 132 implements a transactional protocol to communicate with NVRAM 130. NVRAM controller 132 may also communicate with NVRAM 130 over a bus supporting a native transactional protocol such as a PCI express (PCI-E) bus, desktop management interface (DMI) bus, or any other type of bus utilizing a transactional protocol.

Figure 2:
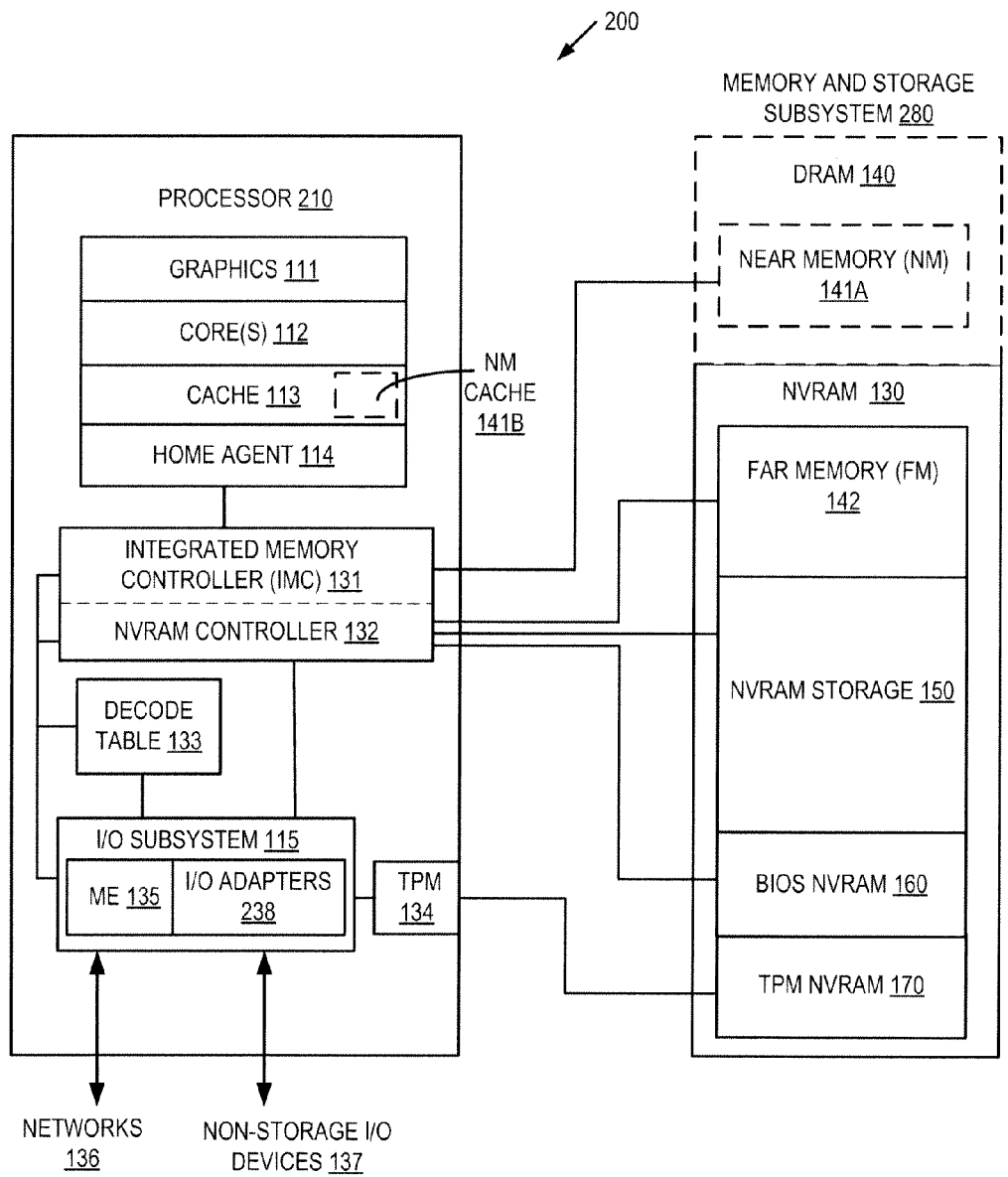
FIG. 2 illustrates a computer system that uses NVRAM as a total replacement for traditional non-volatile mass storage and firmware memory according to one embodiment of the invention.

FIG. 2 is a block diagram illustrating a computer system 200 that uses NVRAM 130 as a total replacement for traditional mass storage 152 and firmware memory (e.g., BIOS flash 162 and TPM flash 172) according to one embodiment of the invention. Computer system 200 includes a processor 210 coupled to a memory and storage subsystem 280. In this embodiment, memory and storage subsystem 280 includes DRAM device 140 and NVRAM 130 only. As described above, NVRAM 130 has configurable partitions including system memory (FM 142), mass storage (NVRAM storage 150) and firmware memory (BIOS NVRAM 160 and TPM NVRAM 170). Processor 210 can be the same as processor 110 of FIG. 1, except that I/O adaptors 238 do not necessarily include all of adaptors 138 of FIG. 1 for accessing traditional mass storage and flash memory. In such a case, computer system hardware and/or software responsible for memory and storage access may implement various intelligent techniques to benefit from the low-latency, high-throughput and robustness of NVRAM 130 (as compared to the traditional flash/magnetic storage, such as traditional mass storage 152, BIOS NVRAM 162 and TPM NVRAM 172).

Configurable Partitioning of the NVRAM

As described before, NVRAM 130 can be partitioned into multiple partitions that have different roles in a platform storage hierarchy. As discussed above, the term "platform storage hierarchy" refers to cache, system memory, mass storage, and firmware memory that serve different purposes (e.g., BIOS storage and TPM storage). In one embodiment, the means by which access is steered to different partitions of NVRAM 130 is via a decode logic. For example, at either manufacturing time or in the field, computer system 100 can program decode table 133 to mark different regions of NVRAM 130 as system memory, mass storage, firmware, among others.

In the embodiment of FIGS. 1 and 2, NVRAM 130 is partitioned into FM 142, NVRAM storage 150, BIOS NVRAM 160 and TPM NVRAM 170. The address range of each partition can be defined in decode table 133. In one embodiment, when IMC 131 receives an access request, the target address of the request is decoded to reveal whether the request is directed toward memory or I/O. If it is a memory request, IMC 131 further determines from the target address whether the request is directed to NM 141A or FM 142. For FM 142 access, IMC 131 forwards the request to NVRAM controller 132. IMC 131 passes the request to the I/O subsystem 115 if this request is directed to I/O (e.g., non-storage and storage I/O devices). I/O subsystem 115 further decodes the address to determine whether the address points to NVRAM storage 150, BIOS NVRAM 162, or other non-storage and storage I/O devices. If this address points to NVRAM storage 150 or BIOS NVRAM 162, I/O subsystem 115 forwards the request to NVRAM controller 132. If this address points to TPM NVRAM 170, I/O subsystem 115 passes the request to TPM 134 to perform secured access. In one embodiment, each request forwarded to NVRAM controller 132 is accompanied with an attribute (also known as a "transaction type") to indicate the type of access. In one embodiment, NVRAM controller 132 may emulate the access protocol for the requested access type, such that the rest of the platform remains unaware of the multiple roles performed by NVRAM 130 in the platform storage hierarchy. In alternative embodiments, NVRAM controller 132 may perform memory access to NVRAM 130 regardless of which transaction type it is. It is understood that the decode path can be different from what is described above. For example, IMC 131 may decode the target address of an access request and determine whether it is directed to NVRAM 130. If it is directed to NVRAM 130, IMC 131 generates an attribute according to decode table 133. Based on the attribute, IMC 131 then forwards the request to appropriate downstream logic (e.g., NVRAM controller 132 and I/O subsystem 115) to perform the requested data access. In yet another embodiment, NVRAM controller 132 may decode the target address if the corresponding attribute is not passed on from the upstream logic (e.g., IMC 131 and I/O subsystem 115). Other decode paths may be implemented.

Figure 3:
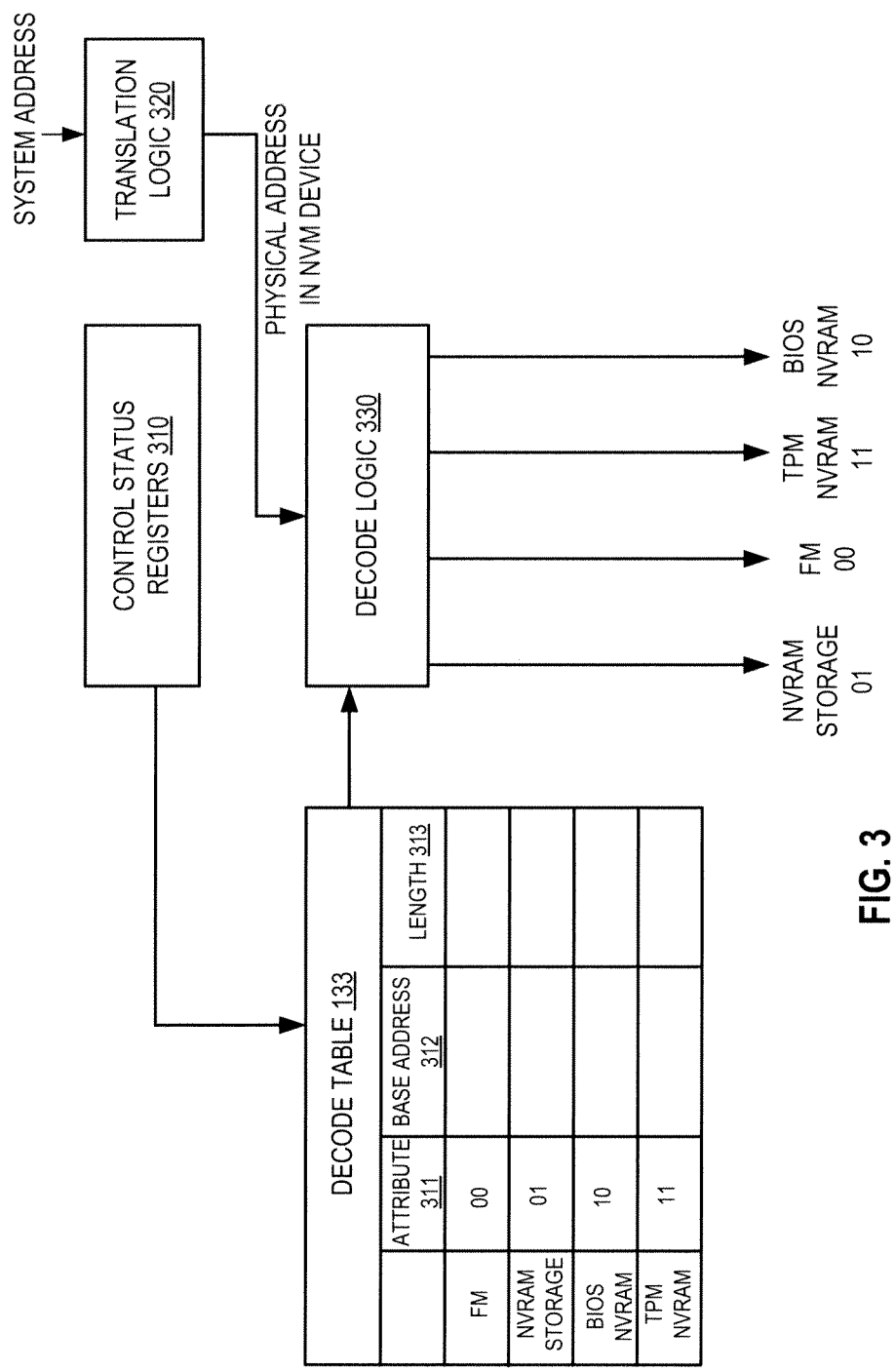
FIG. 3 illustrates a decode logic that decodes an input address according to one embodiment of the invention.

FIG. 3 illustrates a decode logic 330 that decodes an input address and generates an output indicating one of the NVRAM partitions according to one embodiment of the invention. In one embodiment, the input address is a physical address pointing to a location (e.g., a byte location) within NVRAM 130. In one embodiment, the physical address can be translated from a system address (e.g., the address generated by cores 113) by a translation logic 320. The output of decode logic 330 indicates the partition of NVRAM 130 to which the input address is directed. In one embodiment, the output indicates a NVRAM partition by its corresponding attributes; for example, 00 for FM 142, 01 for NVRAM storage 150, for BIOS NVRAM 160 and 11 for TPM NVRAM 170. It is understood that the attributes can be represented by any digital or analog indicators and are not limited by the example described and shown herein. Further, decode logic 330 can map input addresses to more or fewer partitions than the embodiment shown in FIG. 3. For example, if NVRAM 130 is configured (according to decode table 133) to contain only two partitions, decode logic 330 can map input addresses to the two partitions.

In one embodiment, decode logic 330 decodes input addresses based on the configuration data stored in decode table 133. In one embodiment, decode table 133 stores an attribute 311, a base address 312 and a length 313 for each of the partitions in NVRAM 130. Decode table 133 can be built by the BIOS at boot time. For example, the BIOS can read the configuration data stored in control status registers (CSRs) 310 at boot time. CSRs 310 may include a range (e.g., a size) for each partition to be configured in NVRAM 130. The BIOS then builds decode table 133 accordingly.

It should be noted that decode logic 330 is a logical representation of the decoding operations performed within the platform (e.g., computer system 100 of FIG. 1 or computer system 200 of FIG. 2). The hardware that implements decode logic 330 may reside in a single function unit (e.g., IMC 131) or in multiple function units (e.g., any combination of IMC 131, I/O subsystem 115 and/or NVRAM controller 132). Similarly, translation logic 320 may be implemented by a single function unit (e.g., IMC 131), by multiple function units (e.g., any combination of IMC 131, I/O subsystem 115 and/or NVRAM controller 132), or by a combination of software and hardware. Decode logic 330 and/or translation logic 320 may also reside outside of and coupled to IMC 131, I/O subsystem 115 and NVRAM controller 132. For simplicity of illustration, the embodiments of FIGS. 1 and 2 show that each of IMC 131, I/O subsystem 115 and NVRAM controller 132 has a connection to decode table 133 to indicate the possibility that all of them may read from decode table 133 to perform the function of decode logic 330. However, it should be understood that in alternative embodiments, only IMC 131 is, or IMC 131 and I/O subsystem 115 are, connected to decode table 133 to perform the function of decode logic 330.

In one embodiment, CSRs 310 can be implemented by hardware fuses (e.g., programmable read-only memory (PROM) that is programmable only once), re-programmable ROM (e.g., electrically-erasable programmable ROM (EEPROM)), or other programmable hardware. In an embodiment where decode table 133 is re-programmable, those address ranges in decode table 133 can be remotely programmed by an authorized server as described in the embodiment of FIG. 4.

Figure 4:
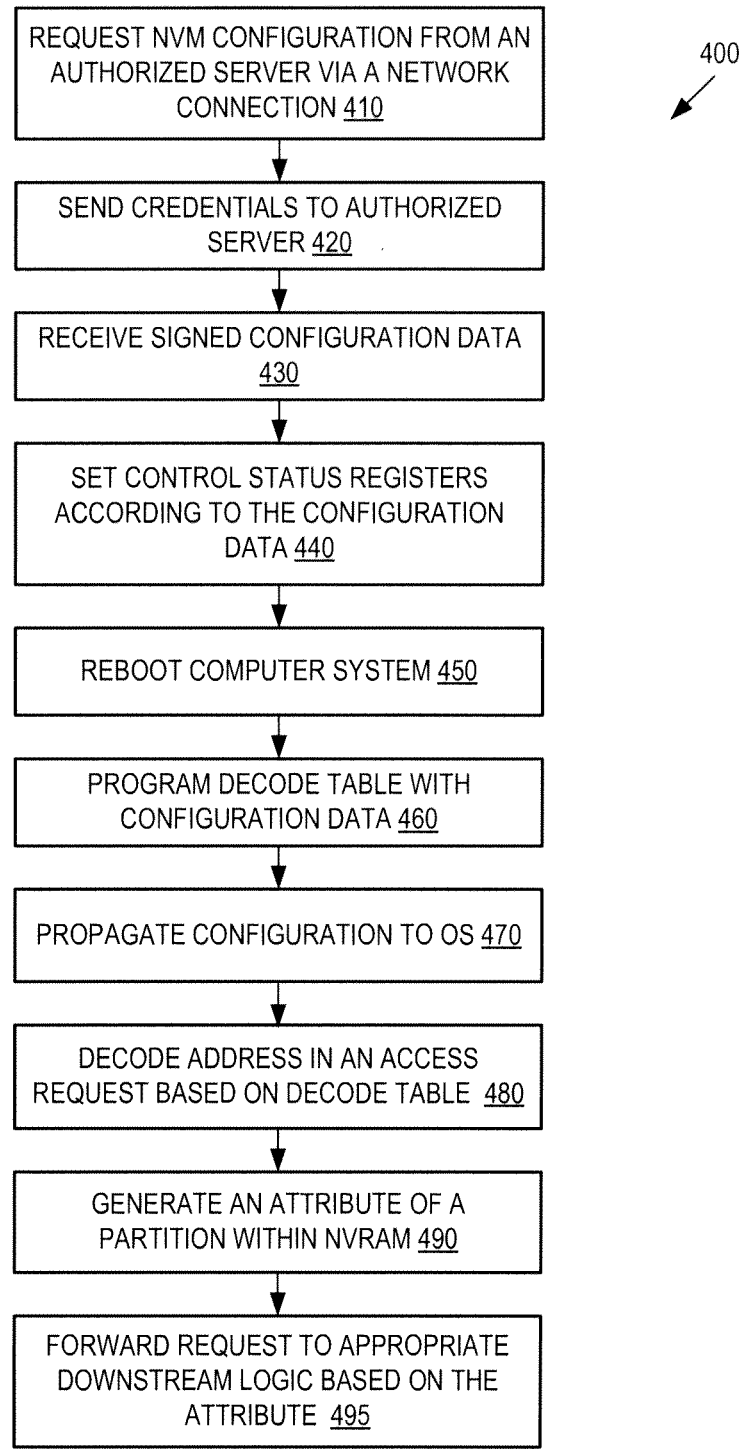
FIG. 4 illustrates a method of configuring the partitions within an NVRAM device according to one embodiment of the invention.

FIG. 4 is a flow diagram illustrating a method 400 of configuring the partitions within an NVRAM according to one embodiment of the invention. For simplicity of discussion, the operations of the flow diagram of FIG. 4 will be described with reference to the embodiment of FIG. 1. However, it should be understood that the operations of the flow diagram can be performed by the embodiment of FIG. 2, as well as embodiments other than those shown in these figures. Additionally, the embodiments discussed with reference to FIGS. 1 and 2 can perform operations different than those discussed with reference to the flow diagram of FIG. 4.

Referring to FIGS. 1 and 4, in one embodiment, computer system 100 requests configuration data from an authorized server for configuring the partitions with NVRAM 130 via a network connection (block 410). The authorized server may be controlled or owned by a manufacturer of computer system 100, a third-party authority, or any authority that holds the rights to configure the NVRAM 130. Via the network connection, computer system 100 (e.g., ME 135) can send its credentials (e.g., encryption keys, which are securely stored in TMP NVRAM 170) to the authorized server (block 420). After the authorized server authenticates computer system 100, it sends back a signed message including the requested configuration data (block 430). Upon receiving the signed message, MC 135 can set CSRs 310 according to the received address ranges (block 440), such that decode table 133 can be programmed at boot time. Computer system 100 then reboots (block 450). During boot time, the BIOS of computer system 100 programs decode table 133 (block 460). The BIOS also propagates the configuration to the OS; e.g., the BIOS can build a number of tables that contains the configuration data for OS to read (block 470).

After computer system 100 is fully booted up and upon receipt of a data access request with an NVRAM physical address, decode logic 330 decodes the address indicated in the request based on the configuration data in decode table 133 (block 480). Decode logic 330 generates an attribute indicating one of the partitions in NVRAM 130 (block 490). Based on the attribute, decode logic 330 forwards the request to appropriate downstream logic (e.g., I/O adaptors 138, TPM 134, and the like) (block 495). The request may be forwarded with a transaction type indicating an attribute of the NVRAM partition. In one embodiment, the downstream logic can determine the appropriate protocol for accessing the partition based on the attribute.

In one embodiment, one of these tables created at block 470 is an affinity table, which stores a logical distance for each underlying memory device. The affinity table allows kernel-level OS code to differentiate between different portions of the system memory that are implemented with different technologies, such as DRAM (NM 141A) and NVRAM (FM 142), and to appropriate OS page migration policy accordingly. For example, NM 141A can be used for frequently accessed data to absorb some of the writes during regular operation of the computer system 100.

In one embodiment, the affinity table includes a logical distance for a range of memory addresses, where the logical distance indicates an actual physical distance, a domain, an access speed/time, or any other metric to represent an access time or distance of a local memory. Based on the information in the affinity table, the OS can direct memory accesses to different locations of memories. For example, an OS can make thread scheduling decisions and resource allocation to operations based on the logical distance of a local memory. Numerous considerations, such as the time critical nature of the operation, may be used to determine which local memory to utilize. For example, an operation that is extremely time-critical can be scheduled to utilize a DRAM (NM 141A), as it is represented in the affinity table by a shorter logical distance than FM 141A. In the alternative, a thread that is to run in the background, which is not time intensive, can be scheduled to use FM 141A, to ensure that NM 142 is available for other operations. Other considerations such as the size of local memory, the type of thread or operation to be executed or performed, or any other known consideration for choosing a memory based on access distance or speed that may be used in determining which local memory to utilize.

Removing Storage Driver Overhead in Storage Access

As described above, NVRAM 130 is non-volatile and randomly accessible. It can be accessed at the granularity of a byte and its access latency is close to today's volatile RAM. As this non-volatile memory offers high capacities closer to traditional storage media, it can replace traditional I/O attached non-volatile mass storage devices in the platform.

As shown in FIG. 2, the use of NVRAM 130 for both system memory (e.g., FM 142) and NVRAM storage 150 can blur the line between the roles of these two different tiers in the platform storage hierarchy. Since both FM 142 and NVRAM storage 150 reside in the same NVRAM 130, they can be viewed as one continuous partition and can be accessed in the same way via the same memory interconnects. Thus, the use of NVRAM storage 150 can remove the burden of traditional I/O data access. That is, I/O protocols such as SATA, PCI-E, and the like, are no longer necessary for storage access. As a result, in some embodiments, NVRAM storage 150 can be accessed without a storage driver performing I/O operations, and instead using CPU memory instructions to copy from storage to memory buffers, thus emulating block access for the OS and application software. Alternately, the OS file system can be aware of the memory addressable storage (i.e., NVRAM storage 150), and directly map the NVRAM storage 150 address space into the application address space. This saves the cost of the copying and the amount of memory used in the system. NVRAM storage 150 is herein referred to as "memory addressable," because it is directly addressable in the physical memory address space and all of the instructions that use memory addresses as oprands will work with the addresses of NVRAM storage 150.

However, legacy software (e.g., OS and applications) may still operate on the assumption that a storage driver exists in the computer system to perform block access. For example, typical legacy operating systems consider data that is in the mass storage but not in the system memory as non-resident, and would trigger a page fault when that data is accessed. A page fault handler then signals the storage driver to bring the data into the system memory. This can be handled in the storage driver by emulating block storage. Alternately, in an OS with a file system aware of the memory addressable storage, page fault handling may be memory-map operation instead of a memory copy or I/O operations.

The benefits of removing the I/O interface and I/O controllers, as well as the reduction of access cost, generally outweigh the cost of software modification due to power saving and increase of speed in storage access. Embodiments of the invention use the PCMS as high-performance storage in the platform, taking advantage of its properties of low power, high capacity, non-volatility and memory mode. Embodiments of the invention remove the traditional storage stack I/O path and make the storage addressable and cacheable by a processor to achieve fastest performance at lowest power.

Embodiments of the invention provide an interface between software and storage (implemented by NVRAM such as PCMS) at a number of levels, which will be described below with reference to FIGS. 5, 7, 8A, 8B and 9. Software (e.g., the OS and applications) and hardware operations shown in these figures can be executed by the embodiment of processor 110 and 210 of FIGS. 1 and 2, as well as embodiments other than those shown in these figures. Additionally, the embodiments discussed with reference to FIGS. 1 and 2 can perform different operations than those discussed with reference to the diagram of FIGS. 5, 7, 8A, 8B and 9.

Figure 5:
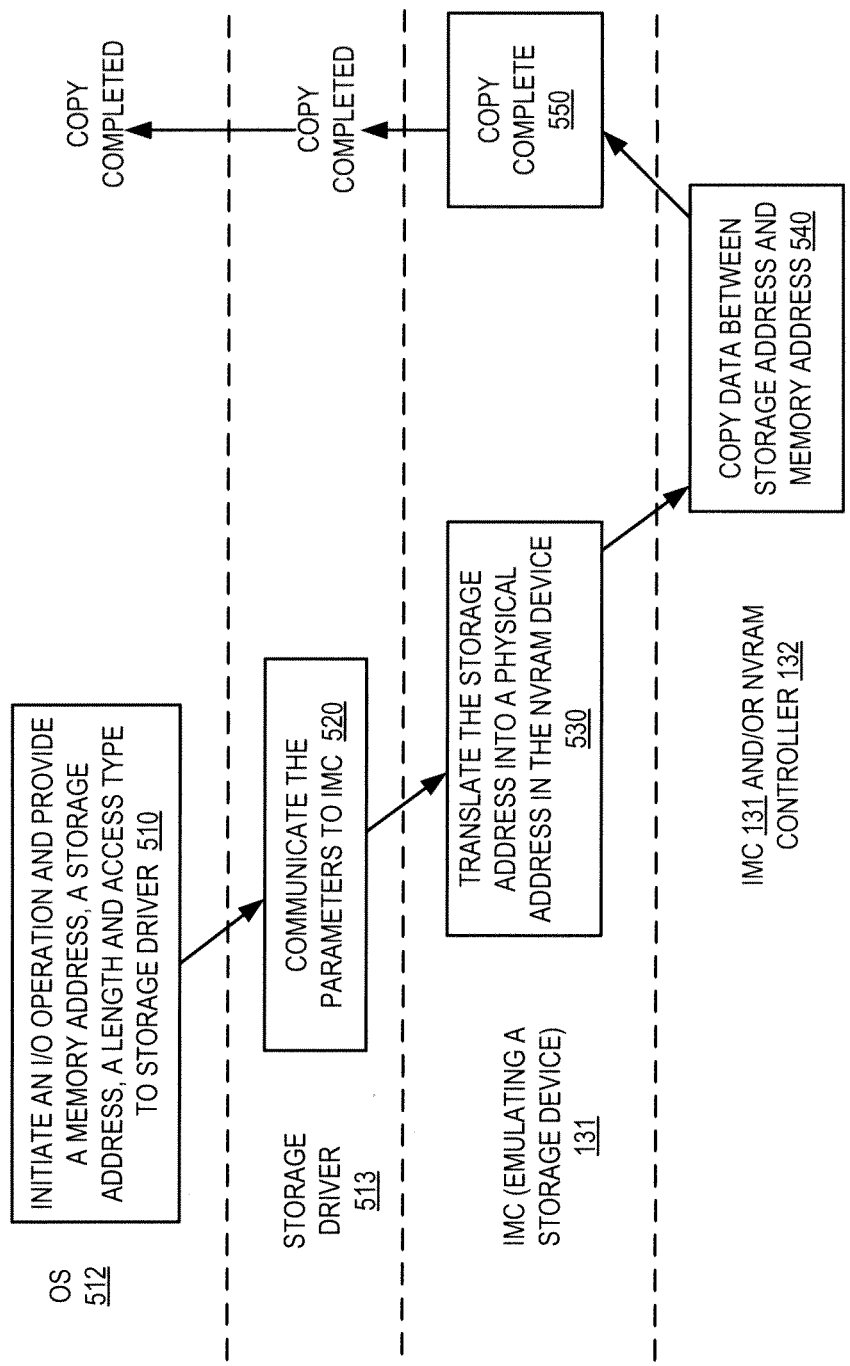
FIG. 5 illustrates an interface between software and storage provided by the NVRAM of FIG. 2 according to a first embodiment of the invention.

FIG. 5 illustrates an interface between software and storage provided by NVRAM 130 of FIG. 2 according to a first embodiment of the invention. In this embodiment, IMC 131 has the additional capability of abstracting NVRAM 130 as traditional non-volatile mass storage (e.g., disks or flash memory) for the software. IMC 131 is coupled to a storage driver 513, which can be implemented in software. To storage driver 513, IMC 131 serves as traditional non-volatile mass storage that is block-addressable. Computer system 200 uses this storage driver 513 as the lowest-level disk driver. In this embodiment, software (OS 512 and applications) can utilize data in NVRAM 130 without modification to the software. That is, data access to a non-resident page (a page not in the system memory) will trigger a page fault and a disk I/O will be performed.

In the embodiment shown in FIG. 5, when OS 512 initiates a storage I/O (e.g., in response to a page fault to bring in a page that is not resident in the system memory such as NM 141A and FM 142), it calls storage driver 513 and provides a memory address, a storage address, a length and an operation type (e.g., read or write) (block 510). Storage driver 513 communicates these parameters to IMC 131 using an interface different from standard I/O interfaces/protocols such as SATA 3.0, PCI-E 3.0, and the like (block 520). The memory address indicates a memory location (in either NM 141A or FM 142) that is to swap pages with the storage location specified by the storage address. IMC 131 translates the storage address into a physical address in NVRAM 130 (block 530). NVRAM controller 132 (or IMC 131 if it implements the protocol for accessing NVRAM 130) then copies data from the memory address to the storage address (if the operation is read), or copies data from the storage address to the memory address (if the operation is write) (block 540).

In one embodiment, the memory address falls within the address space of FM 142. In this embodiment, IMC 131 also translates the memory address into a physical address in NVRAM 130. NVRAM controller 132 (or IMC 131 if IMC can directly access NVRAM 130) then copies data between the memory address and the storage address by performing a memory-to-memory copy within the same NVRAM. In another embodiment where the memory address falls within the address space of NM 141A, the copy involves a memory-to-memory copy between two memory devices (e.g., NVRAM 130 and DRAM 140). After the copy is completed, IMC 131 signals storage driver 513 (block 550), which in turn signals OS 512 indicating that the I/O is completed.

Figure 6A:
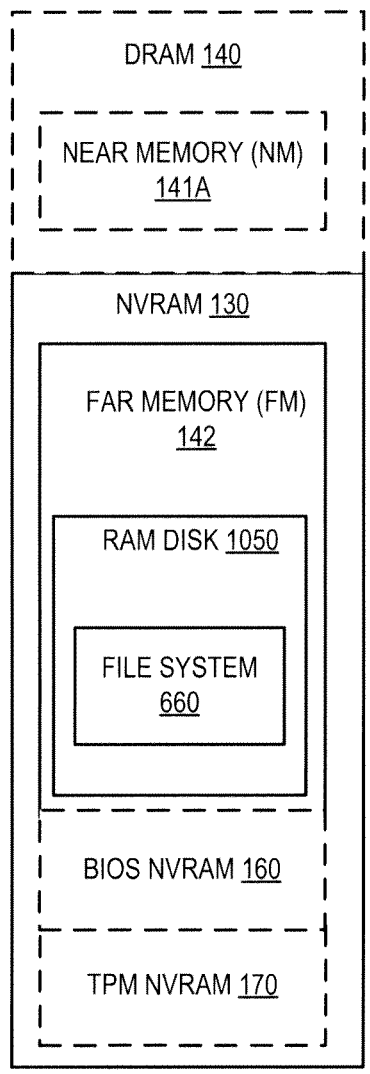
FIG. 6A illustrates a memory and storage subsystem according to an alternative embodiment of the invention.

FIG. 6A illustrates a memory and storage subsystem 680 according to an alternative embodiment of the invention. In this embodiment, memory and storage subsystem 680 replaces NVRAM storage 150 (FIG. 2) with a RAM disk 650 created by an OS. RAM disk 650 serves as storage for a file system 660. The use of RAM disk 650 as storage is described in further detail with respect to the flow diagram of FIG. 7. NVRAM 130 may include more or fewer partitions than what is shown in FIG. 6A (e.g., BIOS NVRAM 162 and/or TPM NVRAM 172 may be absent). In one embodiment, RAM disk 650 is configured and formatted during OS installation, and persists across system boots (like a regular disk).

Figure 7:
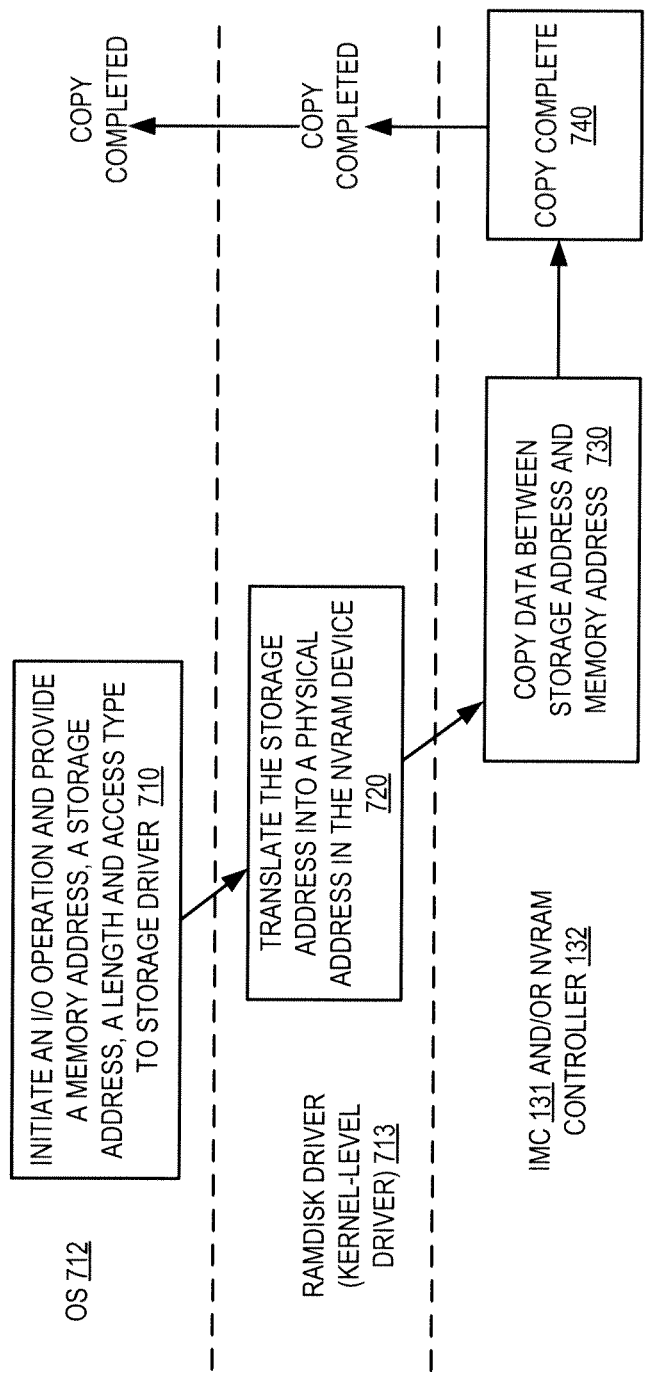
FIG. 7 illustrates an interface between software and storage provided by the NVRAM according to a second embodiment of the invention.

FIG. 7 illustrates an interface between software and storage provided by NVRAM 130 according to a second embodiment of the invention. This second embodiment refers to memory and storage subsystem 680 of FIG. 6A, in which the "storage" is a partition within FM 142 designated by an OS 712 as RAM disk 650 (also known as "RAMDisk"). OS 712 treats RAM disk 650 as a traditional non-volatile mass storage device (e.g., disks or solid-state drives). Access to RAM disk 650 is controlled by a kernel-level driver, referred to as RAM disk driver 713, which presents a standard disk drive to OS 712 and serves as the lowest-level disk driver. In this embodiment, software (OS 712 and applications) can utilize data in NVRAM 130 without modification to the software. That is, data access to a non-resident page (a page not in the system memory) will trigger a page fault and a disk I/O will be performed.

In the embodiment shown in FIG. 7, when OS 712 initiates a disk I/O (e.g., in response to a page fault to bring in a page that is not resident in the system memory such as NM 141A and FM 142 of FIG. 6A), it calls the RAM disk driver 713 and provides a memory address, a storage address, a length and an operation type (e.g., read or write) (block 710). The memory address indicates a memory location (in either NM 141A or FM 142) that is to swap pages with the storage location specified by the storage address. IMC 131 translates the storage address into a physical address in NVRAM 130 (block 720). NVRAM controller 132 (or IMC 131 if it implements the protocol for accessing NVRAM 130) then copies data from the memory address to the storage address (if the operation is read), or copies data from the storage address to the memory address (if the operation is write) (block 730).

In one embodiment, the memory address falls within the address space of FM 142. In this embodiment, RAM disk driver 713 also translates the memory address into a physical address in NVRAM 130. NVRAM controller 132 (or IMC 131 if IMC can directly access NVRAM 130) then copies data between the memory address and the storage address by performing a memory-to-memory copy within the same NVRAM device. In another embodiment where the memory address falls within the address space of NM 141A (which acts as system memory), the copy involves a memory-to-memory copy between two memory devices (e.g., NVRAM 130 and DRAM device 140). After the copy is completed, IMC 131 signals RAM disk driver 713 (block 740), which in turn signals OS 712 indicating that the I/O is completed.

Figure 6B:
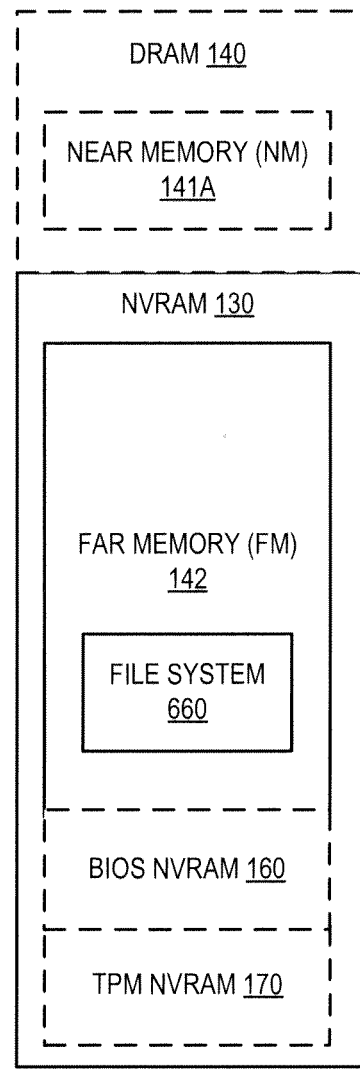
FIG. 6B illustrates a memory and storage subsystem according to an alternative embodiment of the invention.
Figure 8A:
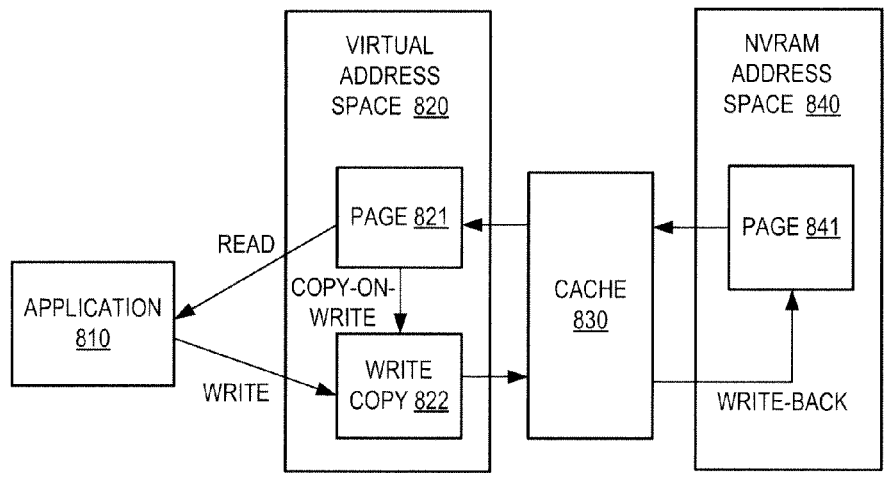
FIG. 8A illustrates an interface between software and storage provided by the NVRAM according to a third embodiment of the invention.
Figure 8B:
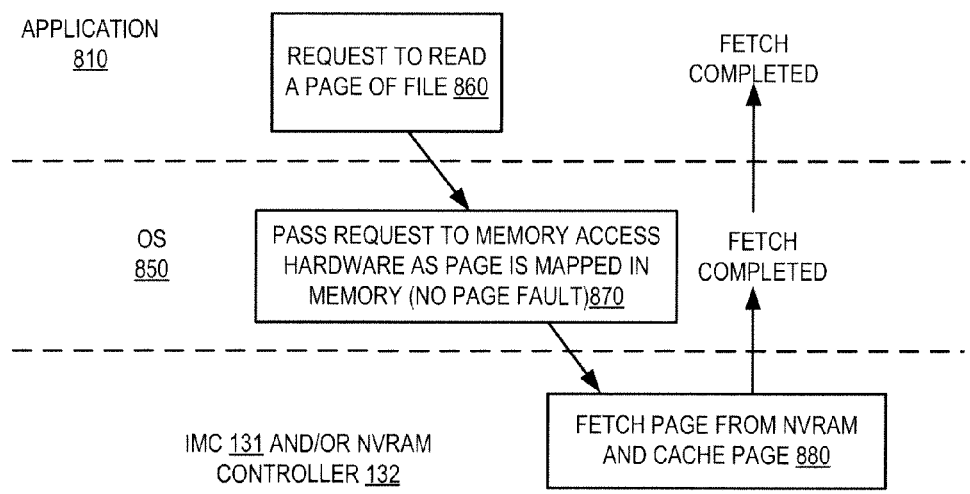
FIG. 8B illustrates the embodiment of FIG. 8A with further details.

FIGS. 8A and 8B illustrate a third embodiment of an interface between software and storage provided by NVRAM 130 with the reference to FIG. 6B according to one embodiment of the invention. FIG. 6B illustrates a memory and storage subsystem 682 according to one embodiment of the invention. In the embodiment shown in FIG. 6B, there is no distinction between mass storage and system memory within NVRAM 130. The OS (OS 850 of FIG. 8B) creates a memory-mapped file system, where FM 142 serves as storage for file system 660. It is understood that NVRAM 130 may include more or fewer partitions than what is shown in FIG. 6B (e.g., BIOS NVRAM 162 and/or TPM NVRAM 172 may be absent).

In a memory-mapped file system, the files used by an application 810 (and are, therefore, in a virtual address space 820 allocated to application 810) can be directly mapped to NVRAM device address space 840. Each address location in NVRAM device address space 840 is directly-addressable by the processor, and is, therefore, "resident" in memory. There is no need to trigger a page fault to bring in a page from storage, because OS 850 understands that the storage is the same as the memory. In this embodiment, OS 850 needs modification to utilize NVRAM 130 but application 810 can be used without modification. By contrast, in a non-memory-mapped file system, each read/write by an application is a system call. If the read/write is directed to a page not already in the memory, the access to that page will involve storage I/O access performed by a storage driver, which is much slower than memory access.

FIG. 8 B illustrates the embodiment of FIG. 8A with further details. Referring to FIGS. 8A and 8B, when application 810 request a read access to a page 821 of a file (block 860), OS 850 passes the request to memory access hardware as page 821 is already mapped in memory as page 841 (block 870). The memory access hardware (e.g., IMC 131 or a combination of IMC 131 and NVRAM controller 132) retrieves page 841 from NVRAM 130 and forward the page to a cache 830 (e.g., an SRAM or DRAM cache) to reduce future access latency (block 880). The memory access hardware then signals OS 850, which in turn signals application 810 that the fetch is completed. Write access to a page can be performed in the same way as read if the page is not already fetched. Additionally, when application 810 modifies a page 821 that has already been fetched, a copy-on-write can be performed to create a write copy 822 of page 821 in virtual address space 820. This write copy can be stored in cache 830 for future access, and can be written back to NVRAM 130 at a later time (e.g., when cache 830 is full and needs to make space for a newly fetched page).

Figure 9:
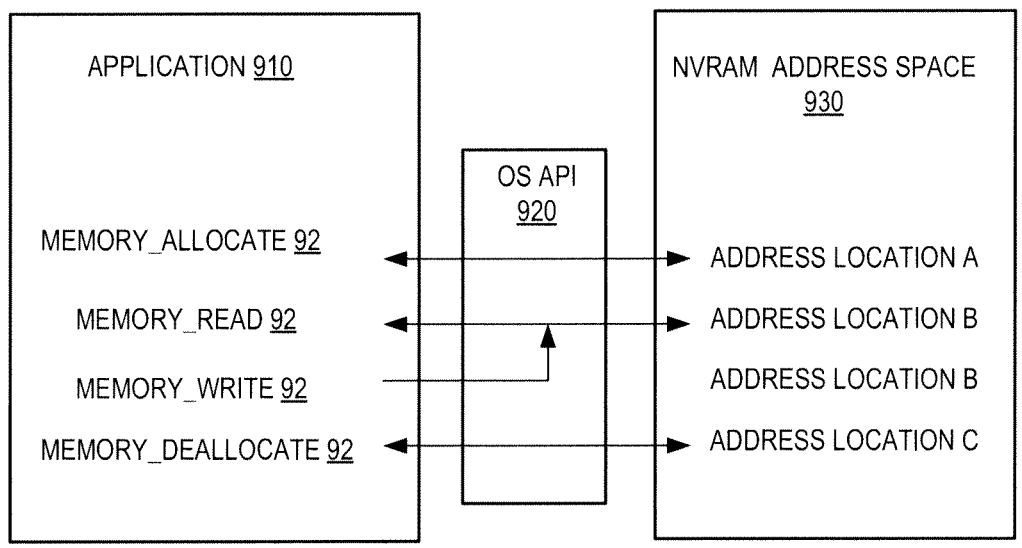
FIG. 9 illustrates an interface between software and storage provided by the NVRAM according to a fourth embodiment of the invention.

FIG. 9 an interface between software and storage provided by NVRAM 130 according to a fourth embodiment of the invention. This second embodiment refers to memory and storage subsystem 682 of FIG. 6B, in which both the OS and applications (e.g., an application 910) need modification to utilize NVRAM 130. The concept of storage disappears in this embodiment. In this embodiment, application 910 can manage NVRAM device address space 930 using memory access instructions. For example, application 910 can call a set of OS Application Programming Interface (APIs) 920 to perform equivalents of memory_allocation, memory_deallocation, memory_read, memory_write, etc. Each of these instructions can be directed at a particular address location in NVRAM 130. Thus, application 910 owns the responsibility of managing the persistence and optimal write management of the data written to NVRAM 130.

The techniques shown in the diagrams of FIGS. 4, 5, 7, 8A, 8B and 9 can be implemented using instructions and data stored on non-transitory machine-readable or computer-readable media, such as non-transitory machine-readable or computer-readable storage media (e.g., magnetic disks; optical disks; random access memory; read-only memory; flash memory devices; and phase-change memory).

Embodiments of the invention may also be provided as a computer program product which may include a non-transitory machine-readable medium having stored thereon instructions which may be used to program a computer (or other electronic device) to perform a process. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
a processor to execute software;
a non flash non-volatile memory coupled to the processor, the non flash non-volatile memory comprising a non flash non-volatile random access memory portion that is byte-rewritable and byte-erasable by the processor, the non flash non-volatile random access memory portion to act as a system memory for the processor's software to execute instructions out of, the non flash non-volatile memory also comprising a partition that is exposed to the software as mass storage;
a memory controller coupled between the processor and the non flash non-volatile memory to access the non flash non-volatile random access system memory portion, the memory controller also to perform a memory access operation to access the partition in response to a request from the software for access to a mass storage wherein the memory controller is to emulate the mass storage to a storage driver in response to the request from the software.

2. The apparatus of claim 1, wherein the non flash non-volatile memory comprises phase change memory (PCM).

3. The apparatus of claim 1, wherein the non flash non-volatile memory comprises chalcogenide.

4. The apparatus of claim 1, wherein the partition is configured as a random access memory (RAM) disk.

5. The apparatus of claim 1, wherein the partition is to store a file system that contains a file, which is mapped to a virtual address space of an application executed by the processor, such that access to the file incurs no page fault.

6. The apparatus of claim 1, wherein the processor is to execute an application that performs memory operations to allocate and access an address space of the non flash non-volatile memory.

7. A method comprising:
receiving, by a memory controller, a request from software executed by a processor to access mass storage, the request not being directed to a peripheral controller; and
performing, by the memory controller, a memory access operation in response to the request to access a partition of non flash non-volatile random access memory that is exposed to the software as mass storage, the memory controller also emulating the mass storage to a storage driver in response to the request from the software;
executing the software by calling instructions and data from another portion of the non flash non volatile memory that behaves as a byte rewritable and byte erasable system memory.

8. The method of claim 7, wherein the non flash non-volatile random access memory comprises phase change memory (PCM).

9. The method of claim 7, wherein the non flash non-volatile memory comprises chalcogenide.

10. A system comprising:
a processor to execute software;
a memory controller coupled to the processor, the memory controller to access a system memory, a first portion of the system memory comprising a dynamic random access memory (DRAM) and a second portion of the system memory comprising a first partition of a non flash non-volatile random access memory that is byte-rewritable and byte-erasable by the processor, the first and second portions of the system memory for the software to execute instructions out of, the memory controller also to couple to a second partition of the non flash non-volatile random access memory and to perform a memory access operation to access the second partition of the non flash non-volatile random access memory in response to a request from the software for access to a mass storage, the memory controller also to emulate the mass storage to a storage driver in response to the request from the software.

11. The system of claim 10, wherein the non flash non-volatile random access system memory comprises phase change memory (PCM).

12. The system of claim 10, wherein the non flash non-volatile random access system memory comprises chalcogenide.

13. The system of claim 10, wherein the second partition of the non flash non-volatile random access memory is configured as a random access memory (RAM) disk.

14. The system of claim 10, wherein the second partition of the non flash non-volatile random access system memory is to store a file system that contains a file, which is mapped to a virtual address space of an application executed by the processor, such that access to the file incurs no page fault.

15. The system of claim 10, wherein the processor is to execute an application that performs memory operations to allocate and access an address space of the system memory.

\* \* \* \* \*